United States Patent [19]

Jacobson

[11] Patent Number: 4,655,305
[45] Date of Patent: Apr. 7, 1987

[54] STRAIN GAGE TYPE PLATFORM SENSOR
[75] Inventor: Walter E. Jacobson, Meriden, Conn.
[73] Assignee: Revere Corporation of America, Wallingford, Conn.
[21] Appl. No.: 747,993
[22] Filed: Jun. 24, 1985
[51] Int. Cl.[4] .......................... G01G 3/14; G01G 3/08; G01L 1/22
[52] U.S. Cl. .................................. 177/211; 177/229; 73/862.65
[58] Field of Search ............................. 177/211, 229; 73/862.65

[56] References Cited

U.S. PATENT DOCUMENTS 4,128,001 12/1978 Marks ............................. 177/229 X
4,146,100 3/1979 Jacobson et al. .................. 177/211

Primary Examiner—George H. Miller, Jr.
Attorney, Agent, or Firm—Cooper, Dunham, Griffin & Moran

[57] ABSTRACT

Apparatus for sensing the load on a platform without error caused by variations in the location of the load on the platform, including an integral sensor block comprising a double cantilever beam having one end attached to a fixed support and the opposite end supporting the platform. The beam is divided into upper and lower portions, each portion having two flexures spaced apart along the length of the beam portion. The flexures on the lower beam portion are spaced apart by a distance greater than the distance between the flexures in the upper beam portion. Strain gage resistance elements are bonded to the outer surface of the upper portion at the flexure.

7 Claims, 4 Drawing Figures

STRAIN GAGE TYPE PLATFORM SENSOR

BRIEF SUMMARY OF THE INVENTION

Apparatus for sensing the load on a platform without error caused by variations in the location of the load on the platform, including an integral sensor block comprising a double cantilever beam having one end attached to a fixed support and the opposite end supporting the platform. The beam is divided into upper and lower portions, each portion having two flexures spaced apart along the length of the beam portion. The flexures on the lower beam portion are spaced apart by a distance greater than the distance between the flexures in the upper beam portion. Strain gage resistance elements are bonded to the outer surface of the upper portion at the flexures. The distance between the flexures in the upper beam portion is made small enough so that all the strain gage resistance elements are formed on a single piece of substrate material, which is then bonded to the flat upper surface of the upper beam portion.

DRAWINGS

FIG. 1

Figure 1:
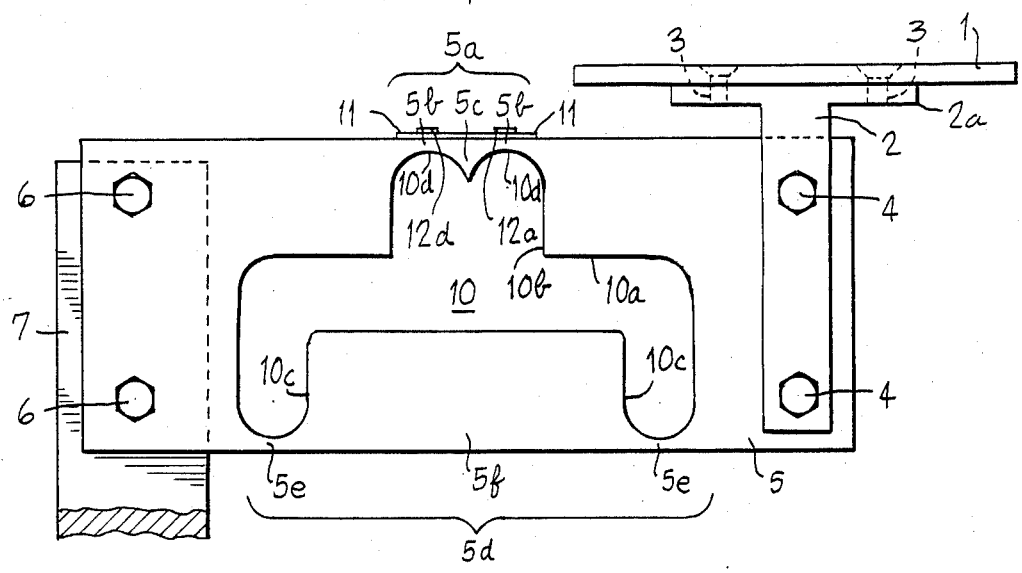
FIG. 1 is an elevational view of a platform sensor embodying the invention.

This figure shows a platform 1 supported on the top of a column 2 having flanges 2a at its upper end. The platform 1 is fastened to the flanges 2a by means of screws 3. The lower end of the column 1 is fastened by two bolts 4 to one end of a sensor block 5. The opposite end of the block 5 is attached by two bolts 6 to a fixed support 7.

The sensor block is provided with a transversely extending aperture generally indicated at 10, and including a longitudinally extending horizontal portion 10a, a middle vertical portion 10b extending upwardly from the longitudinally extending portion 10a and two vertical portions 10c, which extend downwardly from the ends of the longitudinally extending portion. The upwardly extending portion 10b terminates at its upper end in two extensions 10d, which are closely spaced longitudinally of the sensor block 5.

Figure 3:
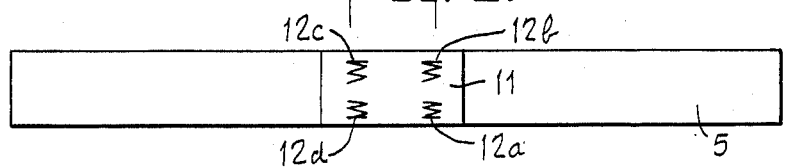
FIG. 3 is a plan view of the sensor block of FIG. 2.

The sensor block 5 acts as a double cantilever beam. The block 5 includes an upper beam portion 5a comprising two flexures 5b of reduced thickness between the upward extensions of 10d of the aperture 10 and the flat upper surface of the beam 5. A thicker part 5c of the beam portion 5a separates the two flexures. The block 5 also includes a lower beam portion 5d including two flexures 5e of reduced thickness between the lower ends of the aperture portions 10c and the flat bottom surface of the block 5. A thicker part 5f of the beam portion 5d separates the flexures 5e. On the flat upper surface of the block 5, there is adhesively attached a single substrate 11, on which are fixed four strain gage resistance elements 12, as shown somewhat diagrammatically at 12a, 12b, 12c and 12d in FIG. 3.

It is alternatively possible to attach the individual resistance elements 12 to separate pieces of substrate, or to attach a pair of elements 12 to a single piece of substrate, and then to adhere those pieces to the flat surface of the block 5.

Nevertheless, there is a substantial manufacturing advantage to the placing of all four strain gage resistance elements 12 on one piece of substrate. The spacing of the elements 12 on the substrate may be readily made the same as the spacing of the flexures 5b in the beam portion 5a. There is then only one operation required to attach the single piece of substrate 11 to the block 5, with all four elements 12 properly positioned in alignment with the flexures 5b.

The flexures 5b and 5e are all created by removing material from the block 5 at the interior aperture 10, leaving the upper and lower surfaces of the block 5 flat. The substrate 11 with its attached resistance elements 12 is much more easily bonded to the block 5 at a flat outer surface than to either a curved surface or an interior surface.

FIGS. 2–4

The four resistance elements 12a, 12b, 12c and 12d are connected in a bridge circuit 13, as illustrated in FIG. 6.

Figure 2:
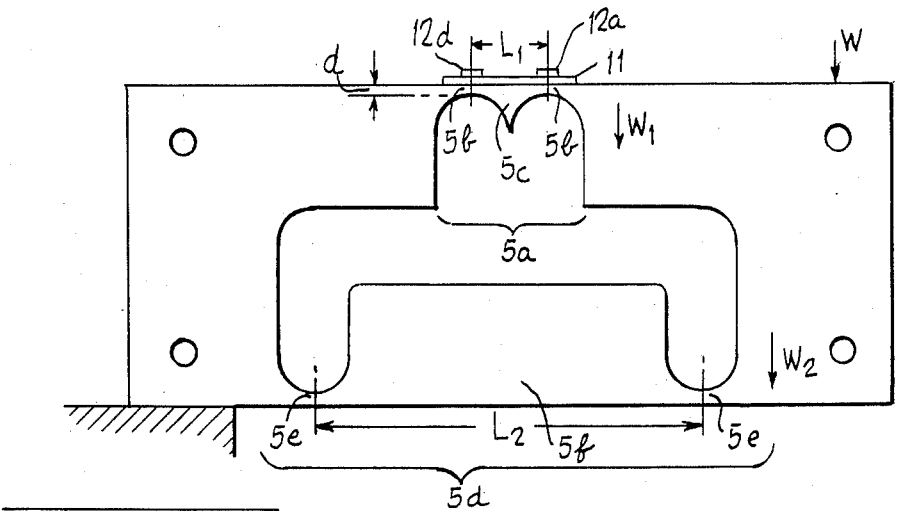
FIG. 2 is an elevational view of an integral sensor block used in the platform sensor of FIG. 1.
Figure 4:
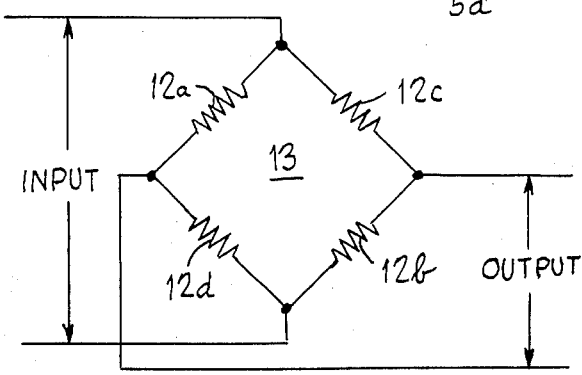
FIG. 4 is a wiring diagram of an electrical bridge circuit including strain sensitive resistance elements as employed on the block of FIGS. 1–3.

A load W (see FIG. 2) applied to the column 2 by a weight deposited on the platform 1 is divided between the load $W_1$ carried by the upper beam portions and a load $W_2$ carried by the lower beam portions. The deflection of the two beam portions at their outer ends are necessarily the same, since they are connected by the massive free end of the beam 5. The upper beam portion, including the flexures 5b, may be considered as a free but guided cantilever beam. The lower beam portion including the flexures 5e may also be considered as a free but guided cantilever beam.

In the following mathematical analysis, the various symbols used have the following meanings:

S = Stress at a flexure
W = Applied load
L = Distance between flexures
d = Flexure thickness
b = Width at flexure
α = Vertical deflection at free end
E = Young's modulus The formulas for stress and deflection of a classic free but guided cantilever beam is explained in $$S = 3WL/bd^2 \tag{1}$$

$$\alpha = WL^3/bd^3E \tag{2}$$

Solving (1) for W, $$W = Sbd^2/3L \tag{3}$$

Solving (2) for W, $$W = bd^3E/L^3 \tag{4}$$

Equating (3) and (4), $$S/3 = \alpha dE/L^2 \tag{5}$$

Eliminating fractions, $$SL^2 = 3\alpha dE \tag{6}$$

Since all factors on the right-hand side of Equation (6) are the same for both upper and lower beam portions, then $$S_1 L_1^2 = S_2 L_2^2 \quad (7)$$

or $$S_1/S_2 = L_2^2/L_1^2 \quad (8)$$

Equation (8) states that the ratio of the stress in an upper flexure to the stress in a lower flexure is inversely proportional to the square of the ratio of the distance between the lower flexures to the distance between the upper flexures.

The term "flexure" as used in this specification is intended to mean the portion of the beam which is of lesser thickness than the other portions of the beam, and thus is more flexible. When stressed, the flexures are subject to greater strain than the other portions of the beam. This strain is measured by the strain gage elements 12a, 12b, 12c, and 12d.

In this specification, the term "flexure system" includes a portion of a beam including more than one flexure. Thus, the term "flexure system" may apply to the upper beam portion 5a or to the lower beam portion 5d. The term "flexure system" is equally descriptive of the complete beam including all four flexures 5b and 5e.

In the load sensing apparatus illustrated, the upper flexure system carries most of the load and the lower flexure system carries a relatively small part of the load and serves principally to stabilize the entire apparatus so that it is not tilted by an off center load placed on the platform 1.

In the structure illustrated, all four of the flexures 5b and 5e have the same thickness. However, it is not necessary to the invention that the thicknesses all be the same. The spring rate of the lower flexure system may be reduced by reducing the thickness 5e below that of the flexures 5b. This causes the upper flexure system to support a greater portion of the load than is indicated by the mathematics above.

I claim:

1. Apparatus for sensing a force acting in a predetermined direction but subject to change in location of the center of application of the force, comprising:
   a. a member comprising a horizontal platform for receiving said force, said member having substantial extent at right angles to said direction;
   b. an integral cantilever beam having one end attached to a fixed support and an opposite end supporting said member against said force, said beam consisting essentially of said ends and first and second generally parallel horizontally elongated portions of equal horizontal transverse dimension connecting said ends, said first portion being closer to said member than the second, said first portion having a flat upper surface which is the upper surface of the beam and being spaced above said second portion, said first portion having two flexures formed therein and spaced apart along the length of said first portion, said second portion having two flexures formed therein and spaced apart along the length of said second portion by a distance greater than the space between the flexures in said first portion; and
   c. strain gage elements attached to the flat upper surface of said first portion at the flexures therein.

2. Apparatus as in claim 1, in which the distribution of stress between said first and second portions of the beam is determined by the ratio of the spacing between the flexures in the second beam portion to the spacing between the flexures in said first beam portion.

3. Apparatus as in claim 1, in which the thickness of the flexures in said second beam portion is less than the thickness of the flexures in said first beam portion.

4. Apparatus as in claim 1, in which said second beam portion has a spring rate which is low as compared to the spring rate of the first beam portion.

5. Apparatus as in claim 1, in which there are four strain gage elements and an insulating substrate supporting said strain gage elements, said substrate being bonded to the flat upper surface of said first beam portion with two of said strain gage elements aligned with each of the flexures in said first portion.

6. Apparatus as in claim 1, wherein said beam is of regular rectangular solid external configuration, and wherein said fixed support and said member are each secured to an end of said beam by at least two vertically spaced fastener elements extending transversely horizontally through the beam.

7. Apparatus for sensing loads applied to a platform of substantial horizontal dimensions, while avoiding errors due to different locations of the load on the platform, comprising:
   a. an elongated cantilever beam having a flat upper surface and a lower surface and having one end adapted for attachment to a fixed support and an opposite end adapted to support the platform;
   b. said beam having a transversely extending continuous aperture between said ends and between the upper and lower beam surface, said aperture comprising a longitudinally extending portion, a middle vertical portion extending upwardly from said longitudinally extending portion and terminating in two closely spaced extensions and two widely spaced vertical portions extending downwardly from said longitudinally extending portion, said extensions of said middle vertical portion cooperating with the upper surface of the beam to define a first pair of flexures spaced apart by a first distance longitudinally of the beam, said downwardly spaced portions of the aperture cooperating with the lower surface of the beam to define a second pair of flexures spaced apart longitudinally of the beam by a second distance greater than said first distance, said first and second pairs of flexures being of equal horizontal transverse dimension; and
   c. strain gages attached to the flat upper surface of the beam at said first pair of flexures.

* * * * *